United States Patent [19]

Lefferson

[11] 3,985,467
[45] Oct. 12, 1976

[54] CONSTANT PRESSURE PUMP

[75] Inventor: Peter Lefferson, St. Petersburg, Fla.

[73] Assignee: Milton Roy Company, St. Petersburg, Fla.

[22] Filed: May 27, 1975

[21] Appl. No.: 580,770

[52] U.S. Cl. .................................. 417/20; 417/22; 417/42; 417/44; 417/45
[51] Int. Cl.² ........................................ F04B 49/06
[58] Field of Search .................. 417/18, 20, 22, 44, 417/45, 42

[56] References Cited
UNITED STATES PATENTS

| | | | |
|---|---|---|---|
| 3,334,285 | 8/1967 | Blake | 417/45 |
| 3,424,370 | 1/1969 | Law | 415/1 |
| 3,439,622 | 4/1969 | Welty et al. | 417/45 |
| 3,502,026 | 3/1970 | Toyodo | 417/45 |
| 3,743,442 | 7/1973 | Wilson | 417/45 |
| 3,797,966 | 3/1974 | Randell | 417/22 |

Primary Examiner—William L. Freeh
Assistant Examiner—G. P. LaPointe
Attorney, Agent, or Firm—Woodcock Washburn Kurtz & Mackiewicz

[57] ABSTRACT

A controller maintains a constant desired fluid pressure in a fluid load driven by a variable flow fluid pump with a variable speed motor. A set point signal representing desired pressure and a signal from a pressure transducer representing actual pressure are applied to an error amplifier. The resulting error signal is applied through a variable gain stage to the motor control. The variable gain stage includes first and second variable gain amplifiers the first of which has a gain which is controlled inversely to pressure. The second variable gain amplifier has a gain which is controlled in proportion to flow. In this manner, the gain of the controller changes in inverse proportion to the restriction of the fluid load. This makes the performance of the controller independent of changes in the fluid load by keeping the total loop gain constant.

7 Claims, 3 Drawing Figures

CONSTANT PRESSURE PUMP

BACKGROUND OF THE INVENTION

This invention relates to constant pressure pumps and more particularly to a pump which will drive a fluid load with a constant pressure over a wide range of restrictions of the fluid load.

Precision pumps find many applications in industry and the laboratory. Metering pumps are used to deliver precise quantities of fluid. Examples of such metering pumps are shown in U.S. Pat. Nos. 3,149,469 and 3,335,670, W. A. Williams.

Metering pumps of the type shown in U.S. Pat. Nos. 2,263,429 and 2,367,893, Sheen and in U.S. Pat. No. 2,260,734, Saalfrank include a piston moving in a cylinder with inlet and outlet ports. The piston transfers precise quantities of liquid between the inlet and outlet ports as the piston reciprocates. Typically, the piston stroke is controlled by a motor driven micrometer drive.

Providing a pump which maintains a constant pressure is difficult because changes in the hydraulic load change the error and stability of the controller for the pump. It is difficult to neutralize the effect of the user's hydraulic system and provide constant performance with all fluid loads.

SUMMARY OF THE INVENTION

In accordance with this invention, a control system for a pump neutralizes the effect of the user's hydraulic system and provides constant performance with all fluid loads.

In accordance with this invention, the loop gain of the entire system is independent of the fluid load by controlling the gain of a variable gain stage in response to the restriction of the load. More particularly, the pressure and the flow of the load control the gains of two variable gain amplifiers in the control loop.

In accordance with another aspect of this invention, a minimum gain loop is connected in parallel with the first and second variable gain amplifiers to provide a small fixed gain thereby facilitating motor startup.

In accordance with another aspect of the invention, a second minimum loop is connected in parallel with the second variable gain amplifier to further reduce the startup time required for the system to reach the desired flow and pressure upon startup.

The foregoing and other objects, features and advantages of the invention will be better understood from the following more detailed description and appended claims.

DESCRIPTION OF A PREFERRED EMBODIMENT

Figure 1:
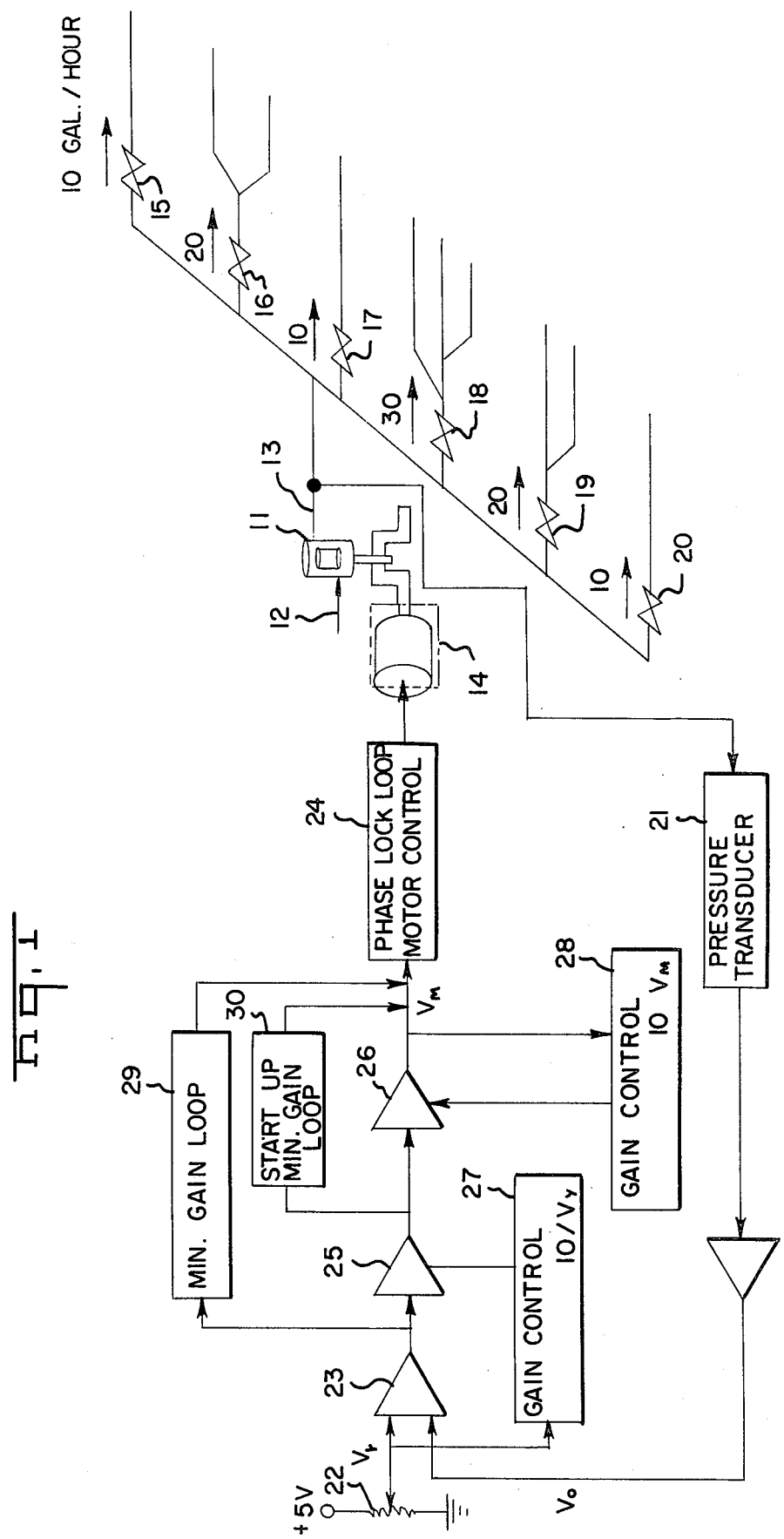
FIG. 1 is a block diagram of the present invention.

Referring to FIG. 1, the pump 11 is of the type having a piston reciprocating in a cylinder. The cylinder has an inlet and an outlet indicated at 12 and 13. The piston transfers quantities of liquid between the inlet and outlet as the piston reciprocates. A variable speed motor 14 drives the piston.

The pump is shown driving a fluid load including valves 15 – 20. Assume that it is desired to maintain the pressure supplied to these 10 loads in parallel constant at 100 p.s.i. The pump controller compares the pump output pressure as sensed by the pressure transducer 21 to a desired set point pressure from the potentiometer 22. An error amplifier 23 compares the desired or set point pressure $V_r$ with the actual pressure and produces an error signal which is applied to the motor control circuit 24 to adjust the speed of the pump 14 thereby maintaining the pressure of the load constant.

However, this control is quite difficult because the fluid load is constantly changing. The controller sensitivity error and stability are normally dependent upon fluid load. Consider an example. Start this example with only the bottom valve 20 open for a flow rate of 10 gal./hour. A 1 gal./hour change in pump speed will produce a pressure change of 1 gal./hour × fluid load (100 psi/10 gal./hour) = 10 psi.

Next, let all of the valves be open for a pump flow rate of 100 gal./hour. The same (1 gal./hour) pump speed change will now produce a pressure change of only 1 gal./hour × fluid load (100 psi/100 gal./hour) = 1 psi. Therefore, the fluid load controls the sensitivity of the system pressure with respect to flow change. If the flow had been turbulent rather than laminar, this pressure change would have changed by 100 to one rather than 10 to one. Control error is the difference between desired or set point pressure and the actual fluid pressure. Assume the error was 1% of desired pressure in the above 10 load example with only the bottom valve open. The loop gain went to one tenth of this when all valves were opened and the error became 9% of desired pressure.

Loop stability is a broad name to describe the pressure overshoot when desired pressure is quickly changed and the tendency for loop oscillation. These are functions of hydraulic and electronic time delays and loop gain. If this simple proportional control system is optimized for fast response time when all valves are open, it may become unstable as the valves are closed and the loop gain is increased ten-fold.

Stated another way, the gain of the system including controller and load is a function of the restriction of the load.

For the foregoing reasons, it is desirable to make the loop gain of the entire system independent of the fluid load. This is accomplished in accordance with the present invention by providing a variable gain stage including a first variable gain amplifier 25 and a second variable gain amplifier 26 between the error amplifier 23 and the motor control circuit 24. The gain of this variable gain stage is controlled in inverse proportion to the restriction of the fluid load.

The restriction of the fluid load is proportional to pressure and inversely proportional to fluid flow. In accordance with this invention, pressure and flow are sensed. The gain of the amplifier 25 is controlled so that it is inversely proportional to pressure. In the embodiment shown, the set point pressure $V_r$ is fed back to the amplifier 25 through gain control 27. It will be appreciated that actual pressure from the pressure transducer 21 could also be fed back to control the gain of amplifier 25 because in the steady state, the actual pressure is equal to the desired pressure so either can be used.

A signal proportional to fluid flow is available at the input of the motor control circuit 24. Since this signal $V_m$ controls motor speed, it is also directly proportional to fluid flow. Other signals representing fluid flow are available in the system and could be obtained, for example, from a flow sensor at the output of the pump. The flow signal $V_m$ is applied through the gain control circuit 28 to control the gain of the variable gain amplifier 26 so that its gain is directly proportional to flow. Where the flow is turbulent instead of laminar the gain of amplifier 26 is controlled in proportion to the square of flow.

Because the gain of amplifier 25 is inversely proportional to pressure and the gain of amplifier 26 is proportional to flow, the gain of the stage which includes these two amplifiers is inversely proportional to the fluid load restriction. That is, as the fluid load restriction goes up, the gain of the stage including amplifiers 25 and 26 goes down. In this way, the overall system gain remains constant regardless of changes in the load.

In this manner, the response time and loop error can be maintained constant over a wide dynamic range. For example, accuracy of 1% of desired pressure can be maintained over a dynamic range of 10,000. This can best be appreciated when it is considered that the ten valve example described in FIG. 1 has a dynamic range of only 10 whereas the controller of this invention is capable of handling a dynamic range of 10,000.

When the pump is first started, the variable gain amplifier stage will be shut off. Therefore, a minimum gain loop 29 is provided for startup. This has an electronic gain of 0.99 (0 db). If the fluid load is light, that is, the fluid gain is small (low pressure and high flow rate) the time to reach the steady state will be quite long. The pump must start at a very low flow rate because the desired pressure is low and because the electronic gain is at its lowest value. This startup situation is greatly improved by providing a second minimum gain loop 30 in parallel with the second amplifier stage and between the output of amplifier 25 and motor control 24. By adding the minimum gain loop 30, the pump starts fast and the controller gain is no longer unity. This can be better understood from the example given in the following table.

The output of the variable gain amplifier 26 is converted into voltage by a conventional operational amplifier circuit 33, the output of which is applied to the output stage 34. The output stage 34 has a constant gain of 100.

The minimum gain of the complete controller is set by a minimum gain loop which includes resistor 35, resistor 36, resistor 37 and resistor 38. When both variable gain stages 25 and 26 are off, the controller gain is 1.

A second minimum gain loop includes resistor 39. This makes the controller startup as short as possible. The first variable gain stage 25 is set before startup by the desired pressure or set point signal from the potentiometer 22. When the second variable gain stage 26 is off, the first variable gain stage output is applied directly through the minimum gain loop including resistor 39 to the input of the amplifier 33.

The gains of the variable gain stages 25 and 26 are controlled by two identical bias current sources. The source controlling the variable gain amplifier 25 includes transistor 40 and an operational amplifier 41 which converts voltage to current. A DC set point signal $V_r$ representing desired pressure is derived from potentiometer 22. It is applied through operational amplifier 42 to operational amplifier 43. The output of operational amplifier 43 is equal to $0.5/V_r$. This signal is converted to current by the transistor 41 which controls the bias current supplied to the variable gain amplifier 25. The gain stages have memory which, in this instance, is provided by the capacitor 44. Assume the control system has reached steady state into some fluid load. Desired pressure is then changed. With a constant fluid load, the controller gain should not change. The capacitor 44 in the bias current source provides this memory. The new steady state of pressure and flow is seen with little delay. Then the variable gain stages slowly shift with one going up while the other goes down. The total gain is unchanged.

The bias current source for the second variable gain

| | DESIRED PRESSURE | | CONTROLLER GAIN AT START WITHOUT START UP LOOP | CONTROLLER GAIN WITH START UP LOOP AT START | START UP FLOW RATE FOR ZERO ACTUAL START UP PRESSURE |
|---|---|---|---|---|---|
| 50 psi | = | 0.5V | 1.0 | 110 | 3 ml/min. |
| 500 | = | .5 | 1.0 | 11.0 | 3 ml/min. |
| 5000 | = | 5.0 | 1.0 | 1.1 | 3 ml/min. |

Figure 2A:
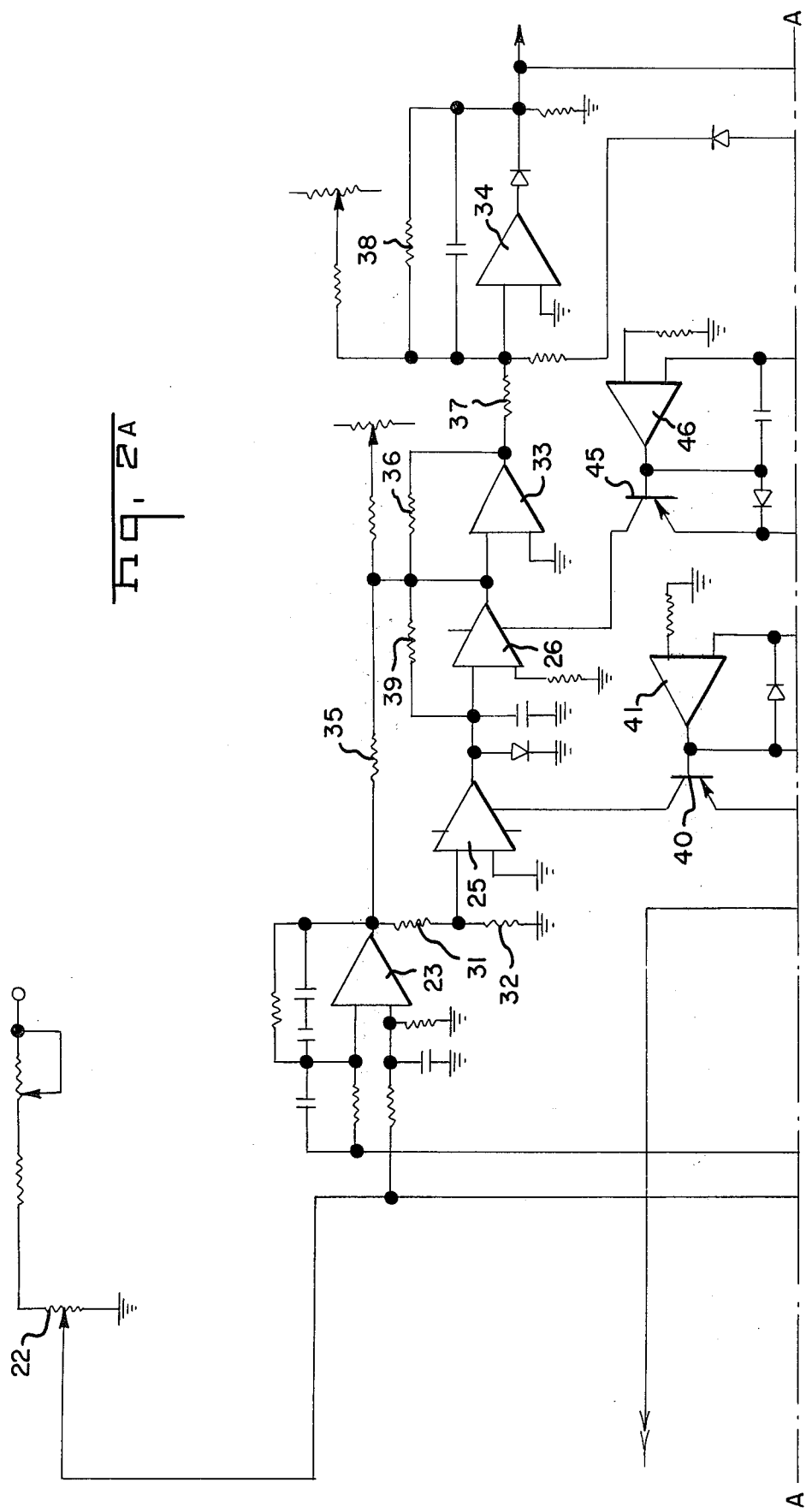
FIGS. 2A and 2B are circuit diagrams of the controller.
Figure 2B:
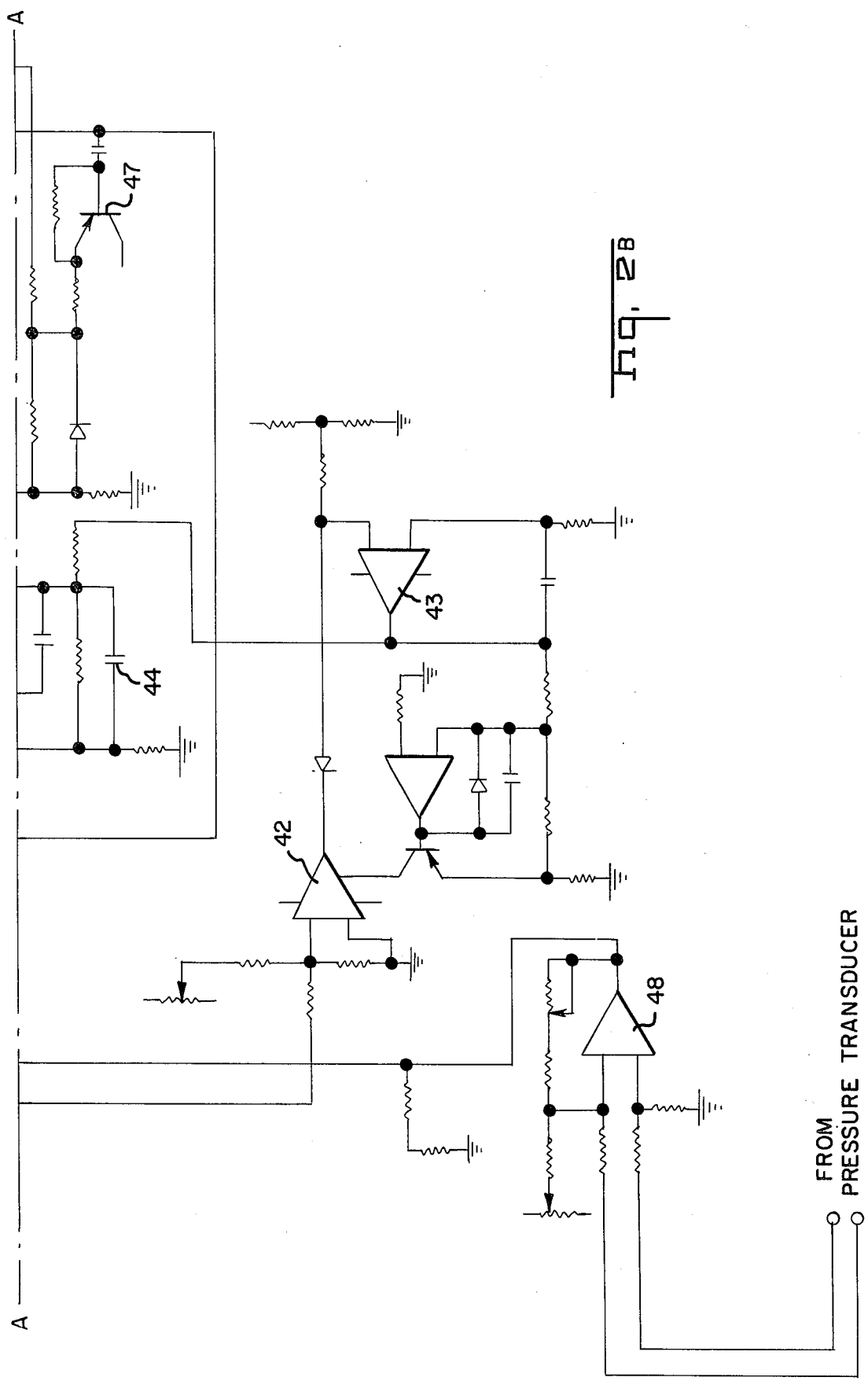

The advantages of the invention will be better understood with reference to the specific example shown in FIG. 2.

The error amplifier 23 is the first stage with a gain of 1. The error signal is applied to a voltage divider including resistors 31 and 32 and then to the first variable gain stage 25. The variable gain stages are transconductance amplifiers which are current sources controlled by the input signal voltage and by the gain control input bias current. The gain of the variable gain amplifier 25 is a function of desired pressure. In this example, the gain has a range of −14 to +26 db (0.2 to 20). The output of amplifier 25 is applied to the variable gain amplifier 26 the gain of which is a function of flow rate. The gain range of amplifier 26 is −26 to 14 db (0.05 to 5.0) for a flow of 0.1 to 10 ml/min.

amplifier 26 includes transistor 45 and operational amplifier 46. This circuit receives a signal proportional to flow and controls the gain of amplifier 26 in proportion to flow.

The transistor 47 provides a startup time delay.

Operational amplifier 48 is a conditioning amplifier for the actual pressure signal from the pressure transducer. The output of amplifier 48 is applied to the error amplifier 23.

The output of the controller shown in FIG. 2 is taken from the amplifier 34. It is applied to a motor control circuit. While various types of motor control circuits may be used, a phase lock loop type of control circuit is particularly suitable.

While a particular embodiment of the invention has been shown and described, various changes may be made without departing from the true spirit and scope of the invention. The appended claims are, therefore, intended to cover all such modifications.

What is claimed is:

1. A control system for maintaining a constant desired fluid pressure in a fluid load driven by a variable flow fluid pump having a variable speed motor comprising:
   means for generating a set point signal representing said desired pressure;
   a pressure transducer responsive to said fluid load for generating an actual pressure signal;
   an error amplifier, said set point signal and said actual pressure signal being applied to said error amplifier to produce an error signal;
   a variable gain amplifier stage including first and second variable gain amplifiers, said error signal being applied to said variable gain stage, the output of said variable gain stage being applied to control the speed of said motor, a signal proportional to pressure being applied to said first amplifier to change the gain thereof in inverse proportion to said pressure; and
   means for generating a signal representing fluid flow in said load, said signal representing flow being applied to said second variable gain amplifier to control the gain thereof in proportion to said flow so that the gain of said amplifier stage is controlled in inverse proportion to the variable restriction of said fluid flow.

2. The control system recited in claim 1 wherein said set point signal is applied to control the gain of said first variable gain amplifier.

3. The control system recited in claim 1 wherein said actual pressure signal is applied to control the gain of said first variable gain amplifier.

4. The control system recited in claim 1 further comprising:
   a minimum gain loop connected in parallel with said first and second variable gain amplifiers and between said error amplifier and said motor, said minimum gain loop providing a small fixed gain between said error amplifier and said motor to facilitate motor startup.

5. The control system recited in claim 4 further comprising a second minimum gain loop connected in parallel with said second variable gain amplifier and between the output of said first variable gain amplifier and said motor, said second minimum gain loop thereby coupling the output of said first variable gain stage to said motor when said second variable gain stage is off during motor startup.

6. The control system recited in claim 1 wherein said first variable gain stage includes a transconductance amplifier controlled by input bias current.

7. The control system of claim 1 in combination with a metering pump comprising:
   a cylinder having a piston reciprocating therein, said cylinder having inlet and outlet ports, said piston transferring quantities of liquid between said inlet and said outlet as said piston reciprocates.

* * * * *